UNITED STATES PATENT OFFICE 2,331,110

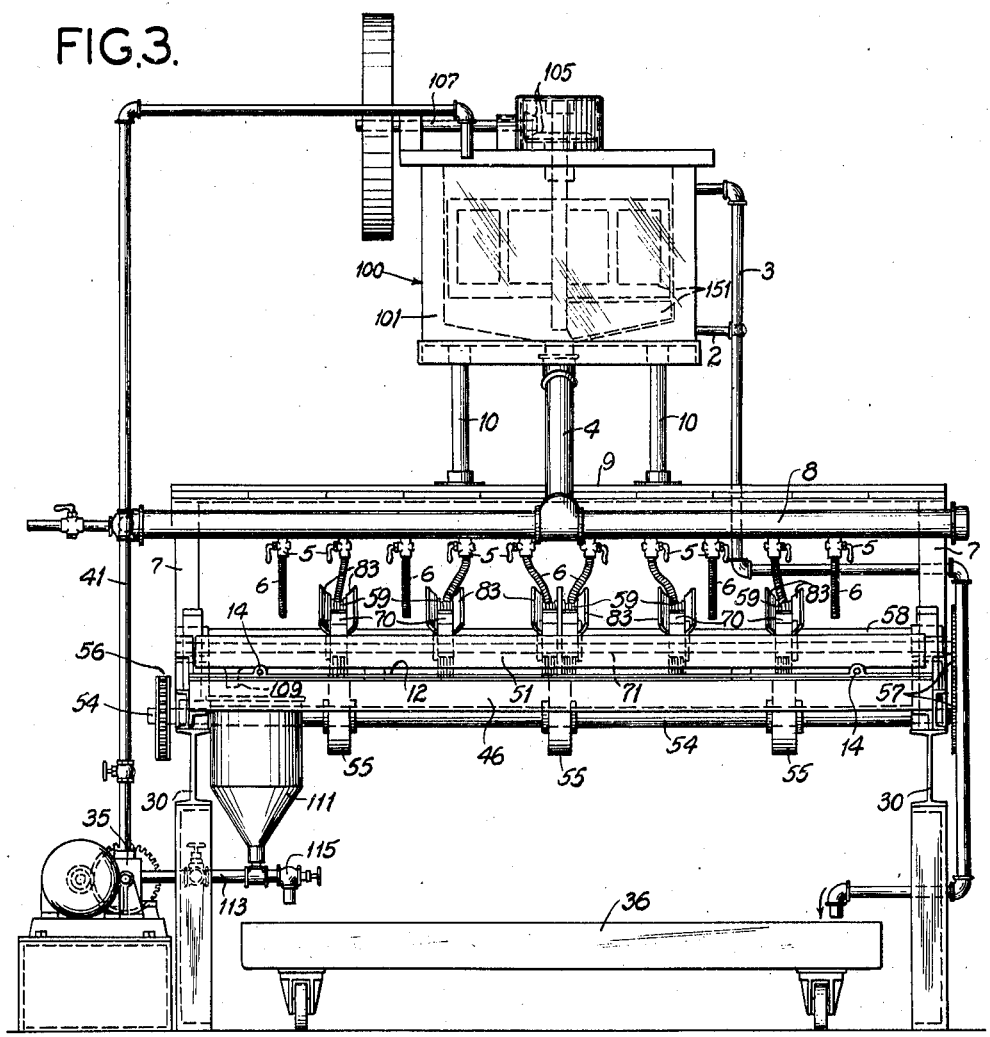

FEEDER

Kennett W. Dillman, Caruthersville, Mo.

Application July 31, 1940, Serial No. 348,613

13 Claims. (Cl. 271—8)

This invention relates to feeders, and with regard to certain more specific features, to a sheet and adhesive feeder.

The invention is an improvement upon the construction specified in the United States patent of Kennett W. Dillman and Robert W. Barbee, No. 2,284,563, dated May 26, 1942, for Apparatus for making reinforced sheets.

Among the several objects of the invention may be noted the provision of automatic means for bringing sheets into engagement with glue-applying rollers and for taking said sheets away from said rollers after the sheets have passed therethrough; the provision of sheet-feeding apparatus of the class described in which the sheets during progress through the rollers are advanced under control of the rollers; and the provision of apparatus of the class described which is simple and fool-proof. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a side elevation of the construction embodying the invention;

Fig. 3 is a left end elevation of Fig. 1 with parts in background omitted for clarity.

Similar reference characters indicate corresponding parts throughout the several views of the drawings.

Figure 1:
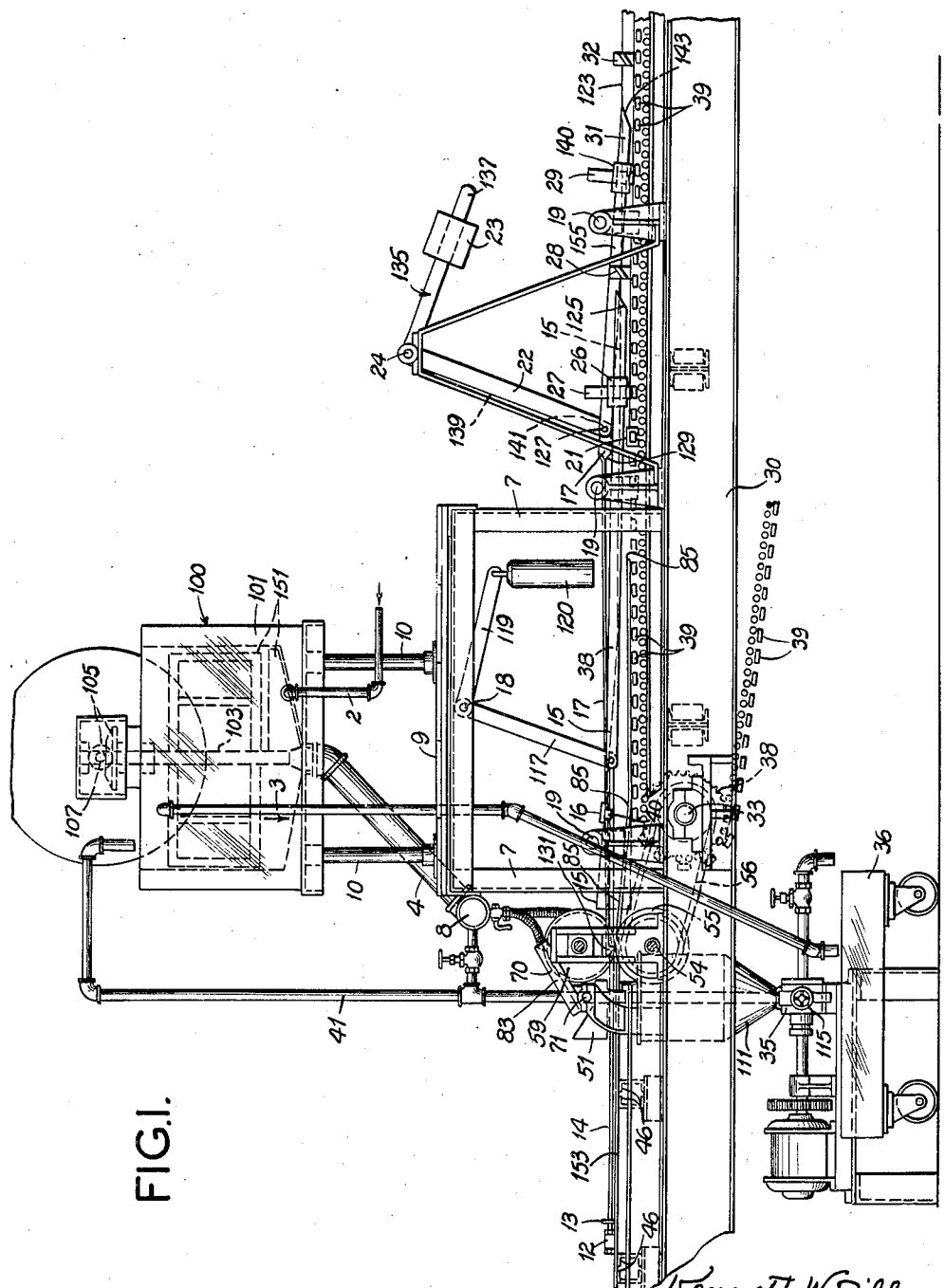

Referring now more particularly to Fig. 1, there is shown at numeral 30 the bed of a machine which carries the parts for supporting an endless conveyor. The conveyor comprises slats 39 which move to the right above the support 30 from a rotary sprocket 38 carried on a cross shaft 33.

Live draw rollers 55 are carried by a shaft 54, the latter being driven by a chain drive 55 from the shaft 33. Above the live rollers 55 are glue-applying rollers 59 carried upon a cross shaft 58. At 11 are stationary bar supports for supporting sheets of material. Each sheet is to be fed into gripping engagement between the rollers 55 and 59 for transmission therebetween, and subsequently to be pushed out over the slats 39. The bars 11 are supported upon cross members 46. The shaft 54 is geared to shaft 58 through gears 57, thus making the glue-applying rollers 59 also live rollers.

Scrapers 70 for controlling the glue applied to the rollers 59 are supported upon a cross shaft 71. The scrapers are associated with side trough pieces 83. A catch pan or trough 51 below the cross shaft 71 serves to receive excessive glue which is scraped from the rollers 59 and flows down the scrapers 70.

The parts thus far described correspond to those described in said patent, and for further details and elaborations, said patent may be consulted; but the above description is sufficient for describing the present improvements.

At numeral 100 is shown a glue mixer which has a heating jacket 101 supplied with steam through a pipe 2 and having an outlet 3. The excess heating fluid, or condensate, flows to a catch basin 36. The mixer is supported by legs 10 upon a platform 9, said platform being located on structural members 7.

Within the mixer is a rotary paddle shaft 103 carrying suitable paddles 154. This shaft is driven through a bevel gear train 105 from a drive shaft 107.

Make-up glue is introduced over a feed line 41 from a pump 35, after the mixer 1 has been charged. The glue flows from the mixer by gravity down through a pipe 4 which supplies a cross pipe or header 8. In the present example the header carries ten outlet cocks 5; this number being exemplary. Each cock has a flexible outlet pipe 6 associated with it. Each cock is controllable to an open or shut position, and it is intended that as many of the outlets 5, 6 be used as may be necessary according to the number of rollers used for applying streaks of glue to a passing sheet.

It is disclosed in said patent that as many or few glue-applying rollers 59 may be used as desired, and furthermore they may be laterally adjusted, along with their cooperating rollers 55. Therefore, not all of the outlets 5, 6 are always used. Therefore the flexible pipes 6 are used as indicated in Fig. 3. They are deflected to supply the glue properly at the desired roller adjustment, the remainder being idle and turned off. It will be understood that the flexible pipes 6 are such that when deflected they maintain a given deflected position. Flexible pipe which will serve this purpose is available, consisting of helically-wound metallic interlocking strip.

Glue which is removed from the glue rollers 59 by the scrapers 70 is directed by the trough pieces 83 into a lateral glue catch pan 51, which is sloped to the left in Fig. 3, and is provided with an outlet 109 directed into a sump tank 111. The sump tank has a return connection 113 with the pump 35, so that circulation of glue may be maintained. A release valve 115 permits of draining out glue to the pan 36 when desired.

The paper, fibre, cardboard or corrugated-board sheets, as the case may be, are placed one-by-one upon the supporting bars 11. In order to feed each of these forward, there is provided a cross-head 12, having adjustable lugs 13 for contacting the back edge of a sheet on the bars 11. This cross-head 12 rides on rails 153. Each sheet is guided on its sides by guides 48.

In order to reciprocate the cross-head 12, it is provided with a pair of connecting rods 14 which extend forward to a pair of crank arms 117 locked on a rocker shaft 18. A weight 120 carried on a forwardly directed arm 119 serves normally to bias the shaft 18 clockwise (Fig. 1) to force the cross head 12 into its rearward or return position. This is accomplished through the linkage 117, 14.

Figure 2:
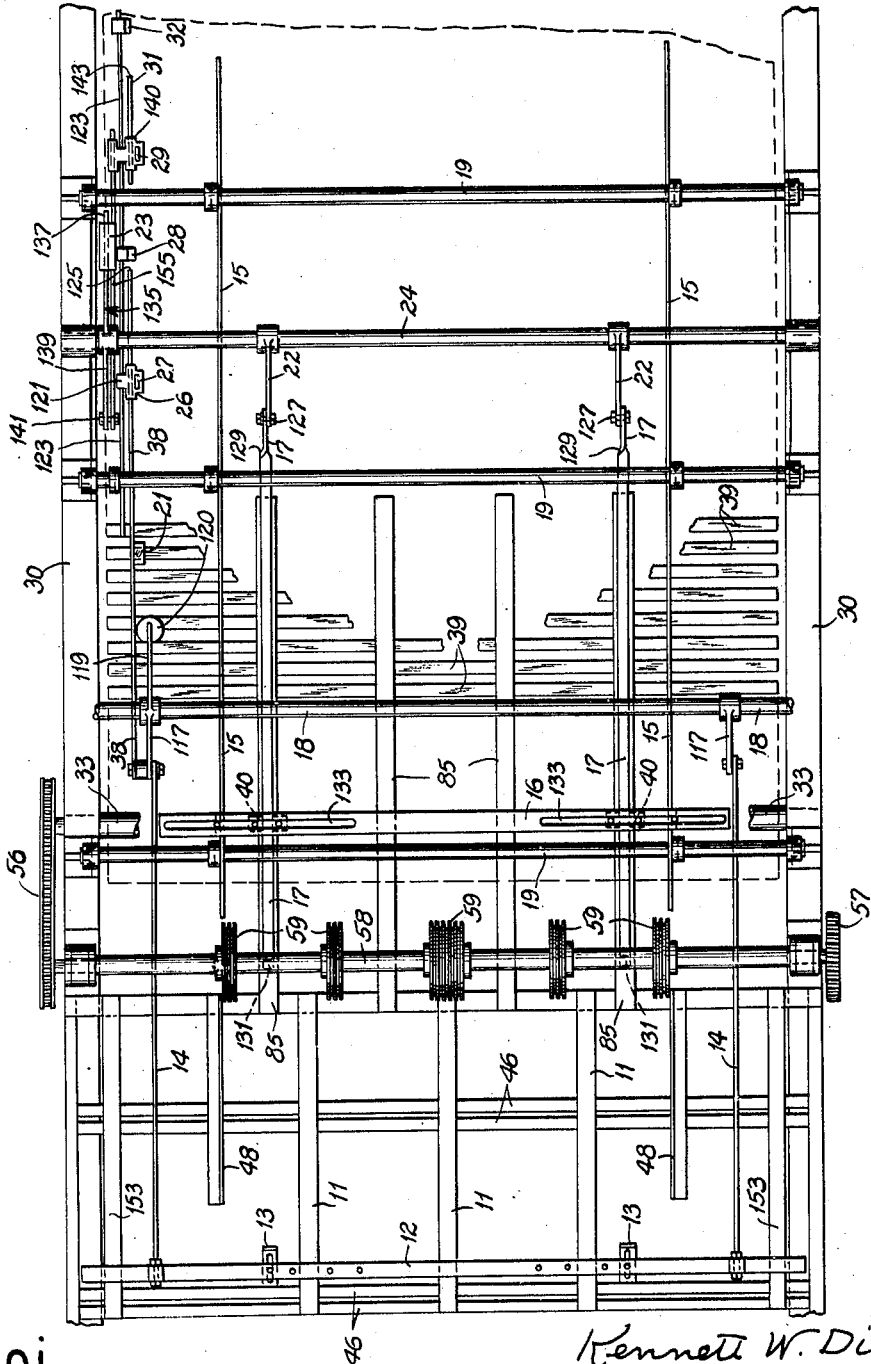
Fig. 2 is a plan view, parts being removed for purposes of clarity.

A drag link 38 is also pinned to the arm 117 adjacent to the weight 120 (see the upper side of Fig. 2). This link 38 extends forward where it carries a cross-head 26, in which is a vertical adjustable contact bar 27. The cross-head 26 has a lug 121 which, for support, slides upon a fixed rail 123, but which may be lifted clear of the rail when necessary, as will appear.

The adjustable bar 27 of cross-head 26 is in the path of, and in due time is driven by, the next one of a series of lugs 21 carried upon one of the advancing slats 39. The end of the drag link 38 is beveled as shown at 125 for contact with a stationary cam or lug 28 when the drag link 38 is drawn forward a suitable distance by the lug 21.

In view of the above, operation of one phase of the invention is as follows:

Normally the cross-head 12 is in its return position shown in Fig. 2, due to the action of the weight 20. This places the stops 13 in retracted position. A sheet is placed ahead of the stops and between the guides 48. Then, as the next lug 21 on a slat 39 engages the contact rod 27 of the cross-head 26, the cross-head is driven forward. The lug 121 of the cross-head at this time rides forward upon the rail 123. The drag link 38 is then pulled forward, thus rotating the shaft 18 and crank arms 117. This draws forward the cross-head 12 by way of the connecting rods 14, and the sheet is pushed by its rear engagement edge toward the rollers 55, 59.

After suitable movement, the beveled end 125 contacts the fixed lug 28 (which however is adjustable on the fixed rail 123). This contact lifts the cross-head 26, with its contact bar 27, clear of the dog 21, so that the weight 20 is then effective to return the linkage 18, 117, 14, 12 to its rearward position as shown in Fig. 2. Thus the forward edge of the sheet has been placed in a position to be received between the rollers 55 and the glue rollers 59. The sheet is thus fed forward while receiving streaks of glue as described in said patent. The dog 21 passes on under the raised bar 27 as the latter returns over the dog.

After the sheet has passed through the rollers, it must traverse a space between the rollers and the travelling bed of slats 39. In order automatically to bring the rear edge of each sheet after it has passed through the rolls into position to be engaged by suitable lugs used in association with the slats 39 and as described in said patent for advancing the sheets, the following mechanism is provided:

This consists in crank arms 22 oscillating on and with shaft 24 and articulated at 127 with grab bars 17. These bars are twisted at 129 to bring their long dimensions flatwise, so that they are more or less springing. Each carries at its rearward end a claw 131 which in the rearward positions of the bar 17 are located behind the edge of a sheet which has gone substantially through the rollers 55 and 59. The claws are so beveled that when a sheet is forced forwardly with respect to a claw, the claw rises and permits the sheet to ride under it, but after the rear edge of the sheet has passed the claw, the claw drops down behind the sheet to hook or grab behind it.

Each claw is over one of a group of supporting bars 85 which extend from the plane of the bars 11 to near the plane of the upper reach of slats 39. The bars 85 are staggered with respect to pairs of rollers 55, 59. At their forward ends, the bars 85 are depressed so that they deliver the sheets substantially into a plane just above the slats 39. The grab bars 17 are also cross-connected by a bar 16 adjustably held at slots 133 by adjustable brackets 40. The bar 16 rides upon lateral stationary guide bars 15 hung from cross bars 19 and frame 30, which causes the claws 131 to follow down the sloping bars 85 to follow and drive the rear edges of the sheets. Bar 16 is in effect another cross-head.

Reciprocation of the bars 17 is accomplished by oscillating the shaft 24. The mechanism for this consists of a bell crank 135 on shaft 24, one arm 137 of which carries a weight 23, and the other arm 139 of which is pinned at 141 to a second drag link 155. The arm 139 is the same length as arm 22 and is directly behind it, in Fig. 1. The drag link 155 carries a cross-head 140 which also rides upon the stationary guide or track 123. The cross-head carries an adjustable contact bar 29 also adapted to be engaged by the dog 21. An extension 31 carries a beveled portion 143 for cooperation with lug 32 adjustably fastened to the track 123. Operation of this part of the invention is as follows:

After the travelling dog 21 has brought about a feeding action by contact with the member 27 of cross-head 26 and the linkage 38, 117, 14, 12 has operated, the cam 28 trips the cross-head 26 up out of the path of the dog 21. The dog 21 then proceeds next to contact with the adjustable bar 29 of the cross-head 141, to carry forward the linkage 155, 139, rotation of shaft 24, arms 22, grab links 17 and claws 131. The claws 131 are at this time behind the rear edge of the sheet which it has advanced practically from between the rollers 55, 59. The action stated pushes the sheets forward from the rollers, down the bars 85 and on to the slats 39, until the extension 31 trips on the lug 32, to raise the cross-head 141 from the guide 123. This clears the bar 29 for return over the dog 21 as the dog proceeds, so that the weight 23 returns this linkage to its rearward position ready for the next sheet.

It is clear that the apparatus is readily timed by adjustments of the spacing of dogs 21 and of the positions of lugs 28, 32, and bars 27 and 29.

The term "glue" is used in the following claims in a sense generic to any suitable adhesive.

The claws 131 and the stops 13 may both be designated as pushers which are operative upon the rear edge of a sheet as it advances over the platform constituted by the bars 11 and 85.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A sheet feeder for cooperatively moving sheets directly to and from continuously driving coating rollers which rollers are located at a fixed center distance from each other for gripping sheets, comprising a supply platform adjacent to the inlet sides of the rollers, reciprocating means for driving a sheet from the platform into position to be gripped and driven by the rollers automatically to be driven therethrough when entered therebetween, a conveyor moving away from the rollers for receiving the sheet, and reciprocating means for moving the sheet from the rollers to said conveyor as the sheet is released by the rollers.

2. A sheet feeder comprising continuously driving rollers which rollers are located at a fixed center distance from each other for gripping sheets, a supply platform adjacent to the rollers, reciprocating means for driving a sheet into position to be gripped and driven by the rollers and to be driven therethrough only when entered therebetween, a conveyor spaced from and moving away from the rollers for receiving the sheet, and reciprocating means for reaching to the edge of the sheet as it leaves the rollers to draw it out over the spacing between the rollers and the conveyor and move it onto the conveyor.

3. A sheet feeder for cooperatively moving sheets to and from coating rollers, comprising a supply means adjacent to the rollers, reciprocating means for driving a sheet into position to be caught by the rollers to be driven therethrough, a conveyor moving away from the rollers for receiving the sheet, reciprocating means for moving the sheet from the rollers to said conveyor, and means movable with the conveyor for driving both of said reciprocating means sequentially.

4. A sheet feeder comprising rollers, reciprocating means for driving a sheet into position to be caught by the rollers to be advanced thereby, a conveyor spaced from and moving away from the rollers for receiving the sheet, reciprocating means for moving the sheet from the rollers to said conveyor, and spaced timing lugs movable with the conveyor for driving said reciprocating means sequentially.

5. A sheet feeder comprising rollers, reciprocating means for driving a sheet into position to be caught by the rollers to be advanced thereby, a conveyor spaced from and moving away from the rollers for receiving the sheet, reciprocating means for moving the sheet from the rollers to said conveyor, and spaced timing lugs movable with the conveyor for driving said reciprocating means sequentially, each reciprocating means comprising a pusher, a drag link, a connection from the pusher to the drag link normally biased to starting position, contact means on each drag link engaged by the lugs, and a release means associated with each contact means for disconnecting from the lug to permit biased return of the pusher connection.

6. In a sheet feeding apparatus for cooperatively moving sheets to coating rollers, power means for the rollers whereby sheets directed therebetween are driven forward, means for supporting sheets for guidance toward the rollers, reciprocating means for pressing the rear edge of a sheet so that the forward edge is forced between the rollers, means normally biasing said reciprocating means to a starting position after partial entry of the sheet between the rollers, a conveyor for receiving the sheet from the rollers, and timing means movable with the conveyor for operating the reciprocating means a predetermined amount.

7. In a sheet feeding apparatus for cooperatively moving sheets to coating rollers, power means for the rollers whereby sheets directed therebetween are driven forward, means for supporting sheets for guidance toward the rollers, reciprocating means for pressing the rear edge of a sheet so that the forward edge is forced between the rollers, means normally biasing said reciprocating means to a starting position, a conveyor for receiving the sheet from the rollers, timing means movable with the conveyor for operating the reciprocating means a predetermined amount to force said sheet between the rollers, and means for releasing the reciprocating means from the timing means on the conveyor after a predetermined amount of movement so that said biasing means may return the reciprocating means to starting position.

8. In a sheet feeding apparatus for cooperatively moving sheets to and from coating rollers, power means for the pressure rollers whereby sheets directed therebetween are driven forward, means for supporting sheets for guidance toward the rollers, reciprocating means for pressing the rear edge of a sheet so that the forward edge is forced between the rollers, means normally biasing said reciprocating means to a starting position, a conveyor for receiving the sheet from the rollers, timing means movable with the conveyor for operating the reciprocating means a predetermined amount to force said sheet between the rollers, means for releasing the reciprocating means from the timing means on the conveyor after a predetermined amount of movement so that said biasing means may return the reciprocating means to starting position, a second reciprocating means biased to a starting position including means for pressing the rear edge of the sheet from the rollers to the conveyor, said timing means sequentially operating the second reciprocating means, and means for releasing the second reciprocating means from the timing means for biased return.

9. In a sheet feeding means for cooperatively moving sheets to and from coating rollers, guiding support means for the sheet, reciprocating means for starting the sheet toward the rollers for subsequent driving therethrough, said reciprocating means being operative upon the rear edge of the sheet, reciprocating means for moving the sheet from the rollers and operative upon said edge, a conveyor movable away from the rollers, said last-named reciprocating means moving said sheet toward the conveyor, means for biasing said reciprocating means to their starting positions, and means movable with the conveyor and cooperating successively with said reciprocating means to operate them to feed a sheet into and from the rollers respectively.

10. In a sheet feeding means for cooperatively moving sheets to and from coating rollers, the rollers being adapted to move an applied sheet, guiding support means for the sheet, reciprocating means for starting the sheet toward the rollers for subsequent movement, said reciprocating means being operative upon the rear edge of the sheet, reciprocating means for moving the sheet from the rollers and operative upon said edge, a conveyor movable away from the rollers, said last-named reciprocating means moving said sheet toward the conveyor, means for biasing both of said reciprocating means to their starting positions, and spaced individual means movable with the conveyor and each cooperating successively with said reciprocating means to actuate them to feed sheets into and from the rollers, the biasing return means being operative between actuations by said means on the conveyor.

11. In a sheet feeding means for cooperatively moving sheets to and from coating rollers, the rollers being adapted to move an applied sheet, guiding support means for the sheet, reciprocating means for starting the sheet toward the rollers for subsequent driving therethrough, said reciprocating means being operative upon the rear edge of the sheet, reciprocating means for moving the sheet from the rollers and operative upon said edge, a conveyor movable away from the rollers, said last-named reciprocating means moving said sheet toward the conveyor, means for biasing said reciprocating means to their starting positions, spaced individual means movable with the conveyor and cooperating successively with said reciprocating means to operate them to feed a sheet into and from the rollers, means for releasing the respective reciprocating means after temporary operation by said operating means on the conveyor, and independent biasing means for returning the respective reciprocating means to their starting positions as they are released.

12. A sheet feeder comprising rollers, a sheet support adjacent one side of the rollers, a conveyor moving away from the rollers on their other sides, reciprocating pushers for starting the sheets toward the rollers, the rollers feeding the sheets therethrough after starting, reciprocating pushers for pressing the sheets from the rollers on the other side and delivering them to said conveyor, and timing means on the conveyor for operating said reciprocating means successively to start the sheets and thereafter to withdraw them from the rollers and move them to said conveyor.

13. A sheet feeder comprising rollers, a sheet support adjacent one side of the rollers, a conveyor moving away from the rollers on their other side, said sheet support having a sloping extension to the conveyor, reciprocating means for starting the sheets toward the rollers from the support, the rollers feeding the sheets therethrough after starting and down the extension, reciprocating pusher means for withdrawing the sheets from the rollers on the other side and delivering them to said conveyor over said extension, timing means on the conveyor for operating said reciprocating means successively to start the sheets and thereafter to withdraw them from the rollers and move them to said conveyor, and guide means for the second reciprocating means to cause the said reciprocating pusher means to move along said sloping extension.

KENNETT W. DILLMAN.